(12) United States Patent
Li et al.

(10) Patent No.: US 12,314,861 B2
(45) Date of Patent: May 27, 2025

(54) SYSTEMS AND METHODS FOR SEMI-SUPERVISED LEARNING WITH CONTRASTIVE GRAPH REGULARIZATION

(71) Applicant: Salesforce, Inc., San Francisco, CA (US)

(72) Inventors: Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 1037 days.

(21) Appl. No.: 17/160,896

(22) Filed: Jan. 28, 2021

(65) Prior Publication Data

US 2022/0156591 A1 May 19, 2022

Related U.S. Application Data

(60) Provisional application No. 63/113,339, filed on Nov. 13, 2020.

(51) Int. Cl.
| | |
|---|---|
| *G06N 3/084* | (2023.01) |
| *G06F 18/2137* | (2023.01) |
| *G06F 18/214* | (2023.01) |
| *G06F 18/22* | (2023.01) |
| *G06F 18/2415* | (2023.01) |

(52) U.S. Cl.
CPC ....... *G06N 3/084* (2013.01); *G06F 18/21375* (2023.01); *G06F 18/2155* (2023.01); *G06F 18/22* (2023.01); *G06F 18/2415* (2023.01)

(58) Field of Classification Search
CPC ................. G06F 18/21375; G06F 18/2155
See application file for complete search history.

(56) References Cited

U.S. PATENT DOCUMENTS

| 11,816,185 B1 * | 11/2023 | Roth ................ G06V 10/7753 |
| 2020/0250304 A1 * | 8/2020 | Kruus ................ G06N 20/00 |
| 2021/0319266 A1 * | 10/2021 | Chen ................ G06V 10/764 |

(Continued)

OTHER PUBLICATIONS

Qiu, Jiezhong, et al. "Gcc: Graph contrastive coding for graph neural network pre-training." Proceedings of the 26th ACM SIGKDD international conference on knowledge discovery & data mining. 2020. (Year: 2020).*

(Continued)

*Primary Examiner* — Li B. Zhen
*Assistant Examiner* — Griffin Tanner Bean
(74) *Attorney, Agent, or Firm* — Haynes and Boone LLP

(57) ABSTRACT

Embodiments described herein provide an approach (referred to as "Co-training" mechanism throughout this disclosure) that jointly learns two representations of the training data, their class probabilities and low-dimensional embeddings. Specifically, two representations of each image sample are generated: a class probability produced by the classification head and a low-dimensional embedding produced by the projection head. The classification head is trained using memory-smoothed pseudo-labels, where pseudo-labels are smoothed by aggregating information from nearby samples in the embedding space. The projection head is trained using contrastive learning on a pseudo-label graph, where samples with similar pseudo-labels are encouraged to have similar embeddings.

14 Claims, 10 Drawing Sheets

(56) References Cited

U.S. PATENT DOCUMENTS

2021/0397885 A1* 12/2021 Sivaraman ............ G06V 40/28

OTHER PUBLICATIONS

Sohn, Kihyuk, et al. "Fixmatch: Simplifying semi-supervised learning with consistency and confidence." Advances in neural information processing systems 33 (2020): 596-608. (Year: 2020).*

Zhu, Linchao, and Yi Yang. "Label independent memory for semi-supervised few-shot video classification." IEEE Transactions on Pattern Analysis and Machine Intelligence 44.1 (2020): 273-285. (Year: 2020).*

Li, Suichan, et al. "Density-aware graph for deep semi-supervised visual recognition." Proceedings of the IEEE/CVF Conference on Computer Vision and Pattern Recognition. 2020. (Year: 2020).*

Abbasi Koohpayegani, Soroush, Ajinkya Tejankar, and Hamed Pirsiavash. "Compress: Self-supervised learning by compressing representations." Advances in Neural Information Processing Systems 33 (2020): 12980-12992. (Year: 2020).*

Cai, Hongyun, Vincent W. Zheng, and Kevin Chen-Chuan Chang. "A comprehensive survey of graph embedding: Problems, techniques, and applications." IEEE transactions on knowledge and data engineering 30.9 (2018): 1616-1637. (Year: 2018).*

* cited by examiner

Algorithm 1: Pseudo-code of CoMatch (one iteration).

1. Input: labeled batch $\mathcal{X} = \{(x_b, y_b)\}_{b=1}^{B}$, unlabeled batch $\mathcal{U} = \{u_b\}_{b=1}^{\mu B}$, encoder $f$, classifier $h$, projection head $g$, memory bank $\text{MB} = \{(p_k^w, z_k^w)\}_{k=1}^{K}$.
2. for $b \in \{1, ..., \mu B\}$ do
   // class probability prediction
3.     $p_b^w = h \circ f(\text{Aug}_w(u_b))$
   // distribution alignment
4.     $p_b^w = \text{DA}(p_b^w)$
   // weakly-augmented embedding
5.     $z_b^w = g \circ f(\text{Aug}_w(u_b))$
   // memory-smoothed pseudo-labeling
6.     for $k \in \{1, ..., K\}$ do
7.         $a_k = \frac{\exp(z_b^w \cdot z_k^w / t)}{\sum_{k=1}^{K} \exp(z_b^w \cdot z_k^w / t)}$      // affinity
8.     end
9.     $q_b = \alpha p_b^w + (1 - \alpha) \sum_{k=1}^{K} a_k p_k^w$
   // strongly-augmented embeddings
10.     $z_b = g \circ f(\text{Aug}_s(u_b))$
11.     $z_b' = g \circ f(\text{Aug}_s'(u_b))$
12. end
13. for $b \in \{1, ..., \mu B\}$ do
14.     for $j \in \{1, ..., \mu B\}$ do
    // pseudo-label graph
15.         $W_{bj}^q = \begin{cases} 1 & \text{if } b = j \\ q_b \cdot q_j & \text{if } b \neq j \text{ and } q_b \cdot q_j \geq T \\ 0 & \text{otherwise} \end{cases}$
    // embedding graph
16.         $W_{bj}^z = \begin{cases} \exp(z_b \cdot z_b'/t) & \text{if } b = j \\ \exp(z_b \cdot z_j/t) & \text{if } b \neq j \end{cases}$
17.     end
18.     $\hat{W}^q = \text{Normalize}(W^q)$
19.     $\hat{W}^z = \text{Normalize}(W^z)$
20. end
    // losses
21. $\mathcal{L}_x = \frac{1}{B} \sum_{b=1}^{B} H(y_b, p(y|\text{Aug}_w(x_b)))$
22. $\mathcal{L}_u^{cls} = \frac{1}{\mu B} \sum_{b=1}^{\mu B} \mathbb{1}(\max q_b \geq \tau) H(q_b, p(y|\text{Aug}_s(u_b)))$
23. $\mathcal{L}_u^{ctr} = \frac{1}{\mu B} \sum_{b=1}^{\mu B} H(\hat{W}_b^q, \hat{W}_b^z)$
24. $\mathcal{L} = \mathcal{L}_x + \lambda_{cls} \mathcal{L}_u^{cls} + \lambda_{ctr} \mathcal{L}_u^{ctr}$
25. update $f, h, g$ with SGD to minimize $\mathcal{L}$.

FIG. 7

| Self-supervised Pre-training | Method | CIFAR-10 20 labels | CIFAR-10 40 labels | CIFAR-10 80 labels | STL-10 1000 labels |
|---|---|---|---|---|---|
| None | MixMatch [3] | 27.84±10.63 | 51.90±11.76 | 80.79±1.28 | 38.02±8.29 |
| | FixMatch [34] | 58.19±8.54 | 83.02±5.87 | 92.04±1.23 | 45.73±8.45 |
| | FixMatch w. DA | 59.42±7.80 | 84.11±5.50 | 92.88±1.15 | 58.06±0.50 |
| | CoMatch | 81.19±5.56 | 91.51±2.15 | 93.76±0.35 | 77.32±0.51 |
| SimCLR [6] | FixMatch w. DA | 72.63±5.37 | 89.69±4.58 | 93.26±0.49 | 71.77±0.21 |
| | CoMatch | 83.91±8.55 | 92.55±1.02 | 94.02±0.32 | 77.46±0.27 |

Table 1: Accuracy for CIFAR-10 and STL-10 on 5 different folds.

FIG. 8

| Self-supervised Pre-training | Method | #Epochs | #Parameters (train/test) | Top-1 Label fraction 1% | Top-1 Label fraction 10% | Top-5 Label fraction 1% | Top-5 Label fraction 10% |
|---|---|---|---|---|---|---|---|
| None | Supervised baseline | ~90 | 25.6M / 25.6M | 25.4 | 56.4 | 48.4 | 80.4 |
| | Pseudo-label | ~100 | 25.6M / 25.6M | - | - | 51.6 | 82.4 |
| | VAT+EntMin. | . | 25.6M / 25.6M | - | 68.8 | - | 88.5 |
| | S4L-Rotation | ~200 | 25.6M / 25.6M | - | 53.4 | - | 83.8 |
| | UDA (RandAug) | - | 25.6M / 25.6M | - | 68.8 | - | 88.5 |
| | FixMatch (RandAug) | ~300 | 25.6M / 25.6M | - | 71.5 | - | 89.1 |
| | FixMatch w. DA CoMatch | ~400 | 25.6M / 25.6M | 53.4 | 70.8 | 74.4 | 89.0 |
| | | ~400 | 30.0M / 25.6M | 66.0 | 73.6 | 86.4 | 91.6 |
| PIRL | Fine-tune | ~800 | 26.1M / 25.6M | 30.7 | 60.4 | 57.2 | 83.8 |
| PCL | | ~200 | 25.8M / 25.6M | - | - | 75.3 | 85.6 |
| SimCLR | | ~1000 | 30.0M / 25.6M | 48.3 | 65.6 | 75.5 | 87.8 |
| BYOL | | ~1000 | 37.1M / 25.6M | 53.2 | 68.8 | 78.4 | 89.0 |
| SwAV | | ~800 | 30.4M / 25.6M | 53.9 | 70.2 | 78.5 | 89.9 |
| MoCov2 | Fine-tune | ~800 | 30.0M / 25.6M | 49.8 | 66.1 | 77.2 | 87.9 |
| | FixMatch w. DA | ~1200 | 30.0M / 25.6M | 59.9 | 72.2 | 79.8 | 89.5 |
| | CoMatch | ~1200 | 30.0M / 25.6M | 67.1 | 73.7 | 87.1 | 91.4 |
| SimCLRv2* | Fine-tune | ~800 | 34.2M / 29.8M | 57.9 | 68.4 | 82.5 | 89.2 |
| | Fine-tune+Distillation | ~1200 | 174.2M / 29.8M | 69.0 | 75.1 | - | - |

Table 2: Accuracy for ImageNet with 1% and 10% of labeled examples.

SYSTEMS AND METHODS FOR SEMI-SUPERVISED LEARNING WITH CONTRASTIVE GRAPH REGULARIZATION

CROSS REFERENCE(S)

The present disclosure is a nonprovisional of and claims priority under 35 U.S.C. 119 to U.S. provisional application No. 63/113,339, filed on Nov. 13, 2020, which is hereby expressly incorporated by reference herein in its entirety.

TECHNICAL FIELD

The present disclosure relates generally to machine learning models and neural networks, and more specifically, to semi-supervised learning with contrastive graph regularization.

BACKGROUND

Machine learning systems have been widely used to implement various tasks, such as image captioning, language recognition, question-answering, and/or the like. For a machine learning model to "learn" a certain task, the machine learning model is often trained with a large amount of training data. For example, the machine learning model "learns" to identify whether an image sample is a picture of the fruit orange(s) by predicting whether each of a number of image samples has orange it, and the prediction results is compared to a ground-truth label to generate a loss objective indicating the difference between the prediction and the truth. The loss objective is then use to update parameters of the machine learning model via backpropagation. Thus, depending on how the ground-truth labels are obtained, the learning method can be supervised (by pre-annotated labels) or not.

Supervised learning for neural models usually require a large amount of manually annotated training data, which can be time-consuming and expensive. Semi-supervised learning (SSL) enables a neural model to learn from a limited amount of labeled data and a large amount of unlabeled data, which reduces the reliance on labeled data and thus improves the training cost-effectiveness. Existing SSL methods mostly follow two trends: (1) using the model's class prediction to produce a pseudo-label for each unlabeled sample as the ground-truth label to train against; (2) unsupervised or self-supervised pre-training, followed by supervised fine-tuning and pseudo-labeling. However, such methods can often be limited because pseudo-labeling (also called self-training) methods heavily rely on the quality of the model's class prediction, thus suffering from confirmation bias where the prediction mistakes often accumulate. In addition, self-supervised learning methods are task-agnostic. Thus the widely adopted contrastive learning methods may only learn representations that are suboptimal for the specific classification task.

Therefore, there is a need to improve semi-supervised learning methods.

BRIEF DESCRIPTION OF THE DRAWINGS

FIGS. 8-13 provide various example performance charts and/or plots showing experiment performance of the co-training framework described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

INTRODUCTION

Figure 1:
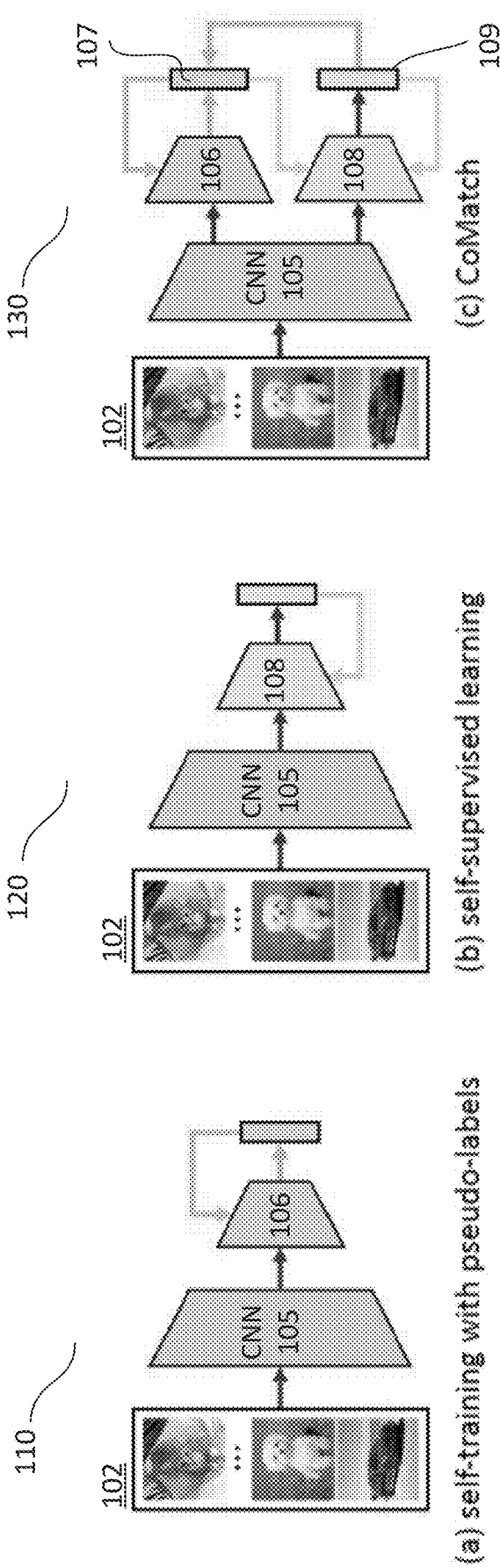
FIG. 1 shows a simplified diagram illustrating various different methods that leverage unlabeled data, according to embodiments described herein.

FIG. 1 shows a simplified diagram illustrating various different methods that leverage unlabeled data, according to embodiments described herein. Diagram 110 in FIG. 1(a) shows an example architecture for task-specific self-training. The model comprises a convolutional neural network (CNN) 105 followed by a classification head 106, which predicts class probabilities for the unlabeled samples 102 as the pseudo-label to train against. A cross-entropy loss may be computed based on the predicted class probabilities and used to update the classification head 106. An example of self-training with pseudo-labels may be entropy minimization, which encourages the classifier's decision boundary to pass through low-density regions of the data distribution. Entropy minimization can be either achieved explicitly by minimizing the entropy of the output probability distribution of the label y given the input x, e.g., p(y|x) on unlabeled samples, or implicitly by constructing low-entropy pseudo-labels on unlabeled samples and using them as training targets in a cross-entropy loss. Most such methods use weakly-augmented samples to produce pseudo-labels and train the model on strongly-augmented samples. However, as the pseudo-labels purely rely on the classifier itself, such self-training strategy often suffers from confirmation bias, causing the error in the pseudo-labels to accumulate and harms learning.

Diagram 120 in FIG. 1(b) shows an example architecture for a task-agnostic self-supervised learning. The model comprises a CNN 105 and a projection head 108 that projects input unlabeled samples 102 into low-dimensional embeddings and performs contrastive learning to discriminate embeddings of different images. A contrastive loss is computed to update the projection head 108. An example self-supervised contrastive learning optimizes for the task of instance discrimination, and formulates the loss using the normalized low-dimensional embeddings. This may be interpreted as a form of class-agnostic consistency regularization, which enforces the same image with different augmentations to have similar embeddings, while different images have different embeddings. However, as self-supervised learning is generally a task-agnostic process, the contrastive loss that optimizes for a specific objective can sometimes partially contradict with task-specific learning. It also enforces images from the same class to have different representations, which is undesirable for classification tasks.

Other examples of existing SSL methods include graph-based SSL, which defines the similarity of data samples with a graph and encourages smooth predictions with respect to the graph structure. Some existing methods use deep networks to generate graph representations to perform iterative label propagation and network training. Some other existing methods connect data samples that have the same pseudo-labels and perform metric learning to enforce connected samples to have similar representations. However, these methods define representations as the high-dimensional feature, which leads to several limitations: (1) since the features are highly-correlated with the class predictions, the same types of errors are likely to exist in both the feature space and the label space; (2) due to the curse of dimensionality, Euclidean distance becomes less meaningful; (3) computation cost is high which harms the scalability of the methods.

Therefore, in view of the need to improve SSL methods for neural models, embodiments described herein provide a co-training framework that jointly learns two representations of the training data, their class probabilities and low-dimensional embeddings. Specifically, two representations of each image sample are generated: a class probability produced by the classification head and a low-dimensional embedding produced by the projection head. Diagram 130 in FIG. 1(c) shows an example architecture of the co-training framework as described in one embodiment. The co-training framework includes a CNN 105, whose output is sent to a classification head 106 and a projection head 108 in parallel. The classification head 106 generates a pseudo-label that is used to compute a cross-entropy loss 107. The projection head 108 generates embeddings to compute a contrastive loss 109. The class probabilities and embeddings interact with each other and jointly evolve in the co-training framework. The embeddings from the projection head 108 impose a smoothness constraint on the class probabilities from the classification head 106 to improve the pseudo-labels. The pseudo-labels are used as the target to train both the classification head 106 with a cross-entropy loss 107, and the projection head 108 with a graph-based contrastive loss 109.

Figure 2:
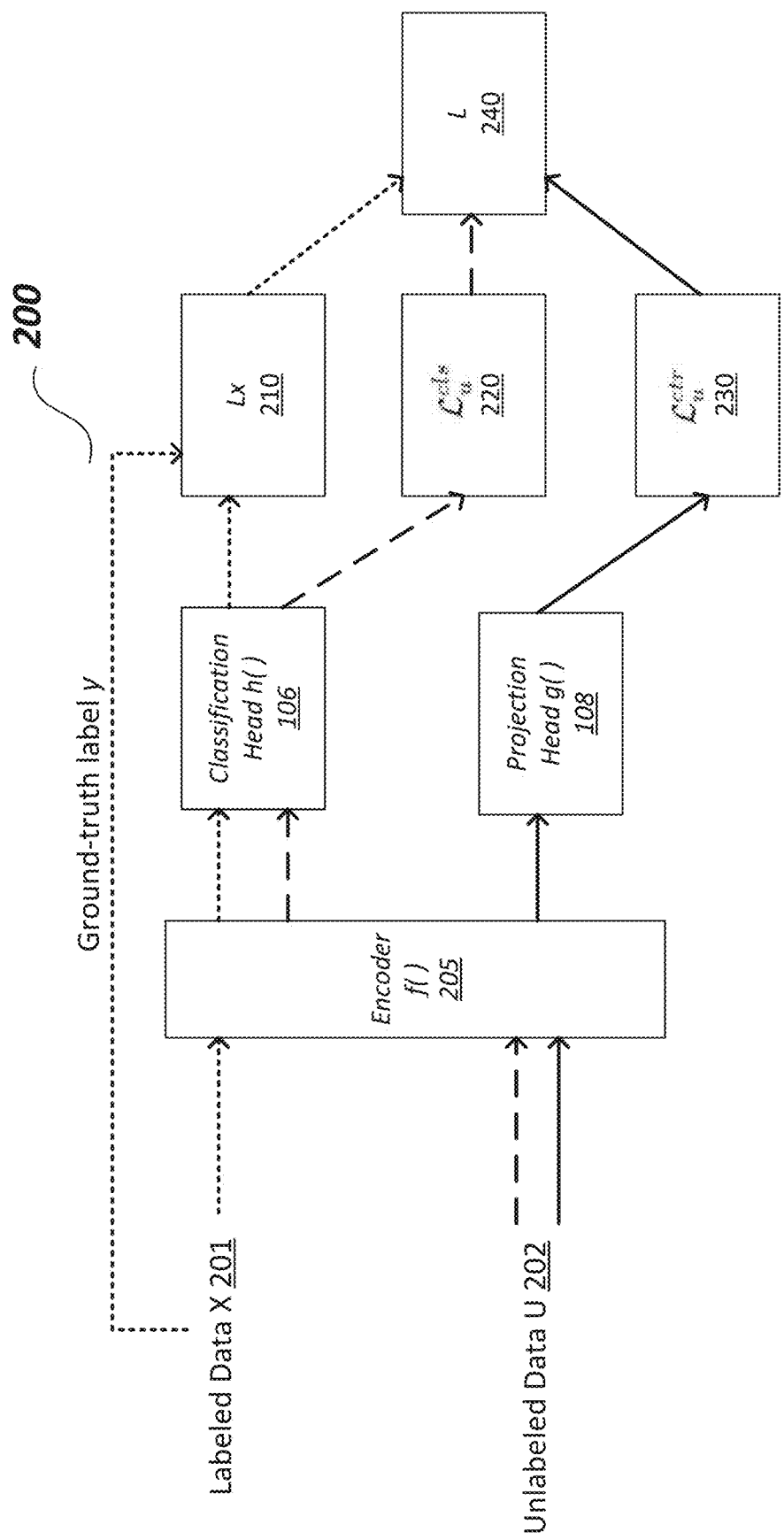
FIG. 2 is a block diagram illustrating a simplified architecture of a co-training framework, according to embodiments described herein.

FIG. 2 is a block diagram illustrating a simplified architecture of a co-training framework 200, according to embodiments described herein. The co-training framework 200 includes a encoder f( ) 205 (which can be the CNN 105 in FIG. 1), the classification head h(·) 106, and the projection head g(·) 108.

The framework receives a batch of B labeled samples $X=\{(x_b, y_b)\}_{b=1}^{B}$ where $y_b$ is the one-hot labels, and a batch of unlabeled samples $U=\{(u_b)\}_{b=1}^{\mu B}$ where $\mu$ determines the relative size of X and U. The framework 200 jointly optimizes three losses: (1) a supervised classification loss Lx computed by loss module 210 on labeled data 201, (2) an unsupervised classification loss $L_u^{cls}$ computed by loss module 220 on unlabeled data 202, and (3) a graph-based contrastive loss $L_u^{ctr}$ computed by loss module 230 on unlabeled data 202.

Specifically, the labeled data 201 may be weakly augmented (e.g., by straightening, adjusting contrast level, and/or the like), and the weakly augmented sample $Aug_w(x_b)$ is sent to the encoder 205 and the classification head 106, e.g., following the data path shown by dotted lines. The classification head 106 outputs a predicted probability. The predicted probability is then used by the loss module 210 to compute the cross-entropy loss between the ground-truth labels y and the predictions:

$$\mathcal{L}_x = \frac{1}{B}\sum_{b=1}^{B} H(\mathcal{Y}_b, p(\mathcal{Y} | Aug_w(x_b)))$$

where H(y, p) denotes the cross-entropy between two distributions y and p.

The unlabeled data 202 may be strongly augmented (e.g., by cropping, flipping, reversing color, and/or the like), and the strongly augmented sample $Aug_s(u_b)$ is sent to the encoder 205 and the classification head 106, e.g., following the data path shown by dashed lines. Thus, loss module 220 computes the unsupervised classification loss $L_u^{cls}$ as the cross-entropy between the pseudo-labels $q_b$ and the model's predictions:

$$\mathcal{L}_u^{cls} = \frac{1}{\mu B}\sum_{b=1}^{\mu B} \mathbb{1}(\max q_b \geq \tau) H(q_b, p(\mathcal{Y} | Aug_s(u_b)))$$

In one embodiment, pseudo-labels may be retained by the largest class probability that is above a threshold τ. Here the soft pseudo-labels $q_b$ are not converted to hard labels for entropy minimization. Instead, entropy minimization may be achieved by optimizing the contrastive loss.

In addition, a different strongly augmented unlabeled data sample is sent to the encoder 205 and the projection head 108, e.g., following the data path shown by the solid lines. The contrastive loss may then be computed based on the output from the projection head 108 and a pseudo-label graph generated based on the pseudo-labels q. Further details of pseudo-labelling and contrastive learning can be found in FIG. 3.

The loss module 240 may then compute the overall training objective:

$$\mathcal{L} = \mathcal{L}_x + \lambda_{cls}\mathcal{L}_u^{cls} + \lambda_{ctr}\mathcal{L}_u^{ctr}$$

where $\lambda_{cls}$ and $\lambda_{ctr}$ are scalar hyperparameters to control the weight of the unsupervised losses. Thus, the overall loss may be used to jointly update the encoder f( ) 205, the classification head h(·) 106, and the projection head g(·) 108.

Figure 3:
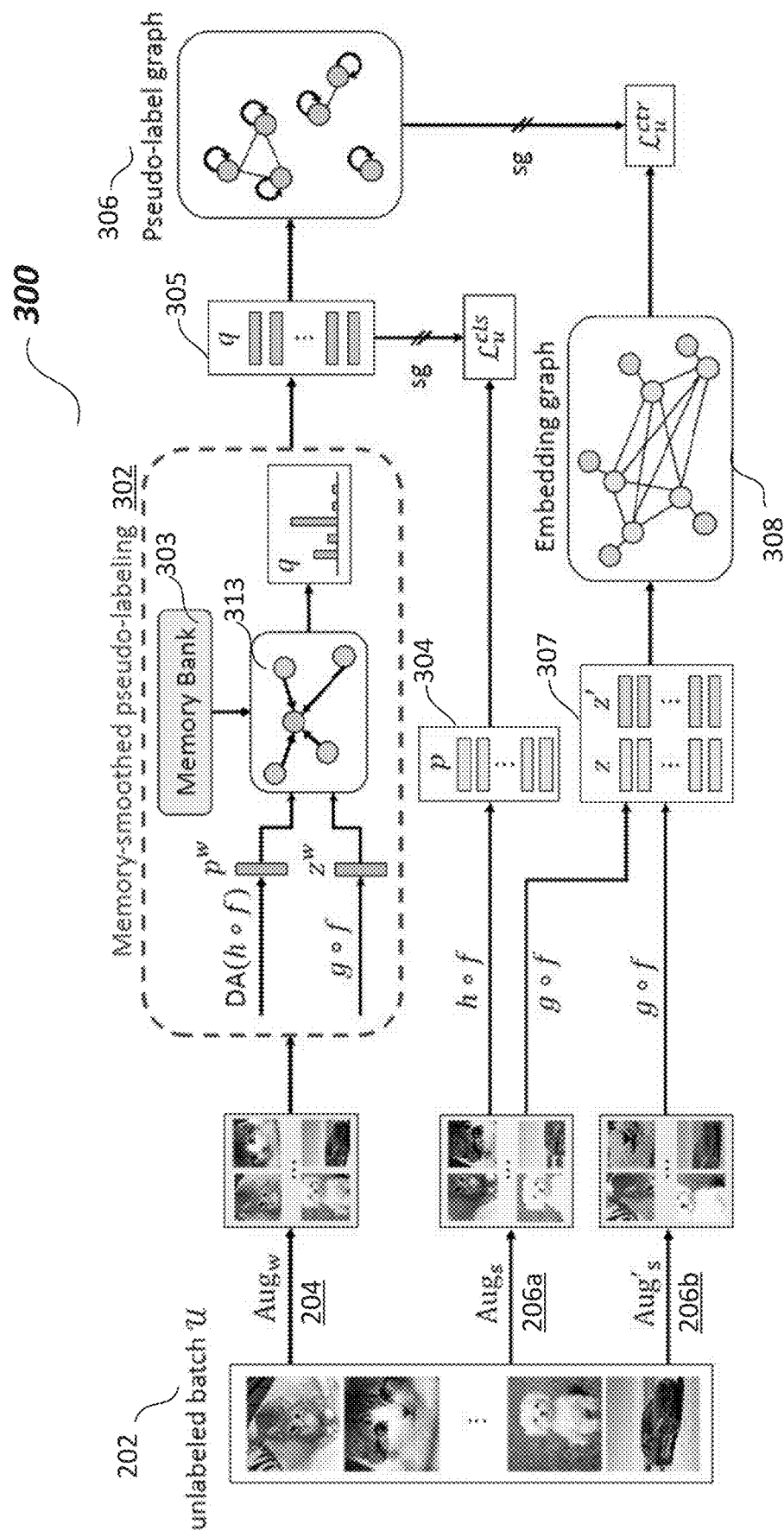
FIG. 3 is a block diagram illustrating details of pseudo-labeling and contrastive learning in FIG. 2, according to embodiments described herein.

FIG. 3 is a block diagram illustrating details of pseudo-labeling and contrastive learning in FIG. 2, according to embodiments described herein.

As shown in FIG. 3, given a batch of unlabeled images U 202 from a training dataset, an image sample $u_b$ is weakly augmented into a weakly augmented sample 204, and strongly augmented into strongly augmented sample 205a-b. For example, the weakly augmented sample 204 may be generated by enlarging, straightening the image sample, and/or the like. The strongly augmented image sample 206a-b are generated by cropping, changing the color tone, highlighting the image sample, and/or the like.

The augmented samples 204 and 206a-b are then encoded by the encoder f( ), followed by the projection head g( )

and/or the classification head h( ). Thus, the high-dimensional feature of each sample is transformed to two compact representations: its class probability p and its normalized low-dimensional embed-ding z, which reside in the label space and the embedding space, respectively. Specifically, the weak augmentation $Aug_w(u_b)$ 204 is sent to the memory-smoothed pseudo-labeling 302 to produce pseudo-labels q 305. Then, a pseudo-label graph 306 Wq is constructed, which defines the similarity of samples in the label space.

On the other hand, strongly augmented sample $Aug_s(u_b)$ 206a is used to generate classification probabilities p 304 from the encoder f( ) and classification head h( ). The strongly augmented samples $Aug_s(u_b)$ 206a and $Aug'_s(u_b)$ 206b are both passed through the encoder f( ) and projection head g( ) to generate embeddings z and z', respectively. The embeddings 307 are used to create an embedding graph Wz 308, which can be trained using the pseudo-label graph Wq 306 as the target. The resulting contrastive loss measures the similarity of strongly-augmented samples in the embedding space.

In one embodiment, within the memory-smoothed pseudo-labeling module 302, each sample in X and U, the class probability is generated. For a labeled sample, the class probability is defined by the corresponding ground-truth label: $p^w=y$. For an unlabeled sample, the class probability is generated by the encoder f( ) and the classification head h( ), and defined by the model's prediction on its weak-augmentation: $p^w=h \circ f(Aug_w(u))$. Distribution alignment (DA) may be applied on unlabeled samples: $p^w=DA(p^w)$. Further details of the DA operation can be found in Berthelot et al., Remix-match: Semi-supervised learning with distribution alignment and augmentation anchoring, in proceedings of ICLR, 2020, which is hereby expressly incorporated by reference herein in its entirety. DA prevents the model's prediction from collapsing to certain classes. Specifically, the moving-average $\tilde{p}^W$ of $p^w$ is maintained during training, and the current $p^w$ is adjusted with $p^w=\text{Normalize}(p^w/\tilde{p}^W)$, where $\text{Normalize}(p)_i=p_i/\Sigma_j p_j$ renormalizes the scaled result to a valid probability distribution.

For each sample in X and U, the embedding $z^w$ is obtained by forwarding the weakly-augmented sample 204 through encoder f( ) and the projection head g( ). Then, we create a memory bank 303 to store class probabilities and embeddings of the past K weakly-augmented samples: $MB=\{(p_k^w, z_k^w)\}_{k=1}^K$. The memory bank 303 contains both labeled samples and unlabeled samples and is updated with first-in-first-out strategy.

For each unlabeled sample $u_b$ in the current batch with corresponding classification probability and embeddings $p_b^w, z_b^w$, a pseudo-label $q_b$ is generated by aggregating class probabilities from neighboring samples in the memory bank 303. For example, a cluster of neighboring samples 313 around the respective $p_b^w, z_b^w$ pair may be used to find the pseudo-label 305 that minimizes the following objective:

$$J(q_b) = (1-\alpha)\sum_{k=1}^K a_k \|q_b - p_k^w\|_2^2 + \alpha \|q_b - p_b^w\|_2^2$$

The first term is a smoothness constraint which encourages $q_b$ to take a similar value as its nearby samples' class probabilities, whereas the second term attempts to maintain its original class prediction. $a_k$ measures the affinity between the current sample and the k-th sample in the memory, and is computed using similarity in the embedding space:

$$a_k = \frac{\exp(z_b^w \cdot z_k^w / t)}{\sum_{k=1}^K \exp(z_b^w \cdot z_k^w / t)}$$

Since $a_k$ is normalized (i.e. $a_k$ sums to one), the minimizer for $J(q_b)$ can be derived as:

$$q_b = \alpha p_b^w + (1-\alpha)\sum_{k=1}^K a_k p_k^w.$$

Given the pseudo-labels $\{q_b\}_{b=1}^{\mu B}$ 305 for the batch of unlabeled samples, the pseudo-label graph 306 may be built by constructing a similarity matrix $W^q$ of size $\mu B \times \mu B$:

$$W_{bj}^q = \begin{cases} 1 & \text{if } b=j \\ q_b \cdot q_j & \text{if } b \neq j \text{ and } q_b \cdot q_j \geq T \\ 0 & \text{otherwise} \end{cases}$$

Specifically, samples with similarity lower than a threshold T are not connected in the pseudo-label graph 306, and each sample is connected to itself with the strongest edge of value 1 (i.e. self-loop). Thus, the pseudo-label graph 306 serves as the target to train an embedding graph 308.

To construct the embedding graph 308, the two strongly-augmented samples 206a-b are passed through the encoder f and the projection head g to generate the corresponding embeddings 307: $z_b = g \circ f(Aug_s(u_b))$, $z'_b = g \circ f(Aug'_s(u_b))$. The embedding graph $W^z$ 308 is built as:

$$W_{bj}^z = \begin{cases} \exp(z_b \cdot z'_b / t) & \text{if } b=j \\ \exp(z_b \cdot z_j / t) & \text{if } b \neq j \end{cases} \quad q_b = \alpha p_b^w + (1-\alpha)\sum_{k=1}^K a_k p_k^w.$$

The encoder f( ) and the projection head g( ) are trained in a way such that the embedding graph 308 has the same structure as the pseudo-label graph 306. To this end, the pseudo-label graph $W^q$ 306 and the embedding graph $W^z$ 308 with $\hat{W}_{bj}=W_{bj}/\Sigma_j W_{bj}$, so that each row of the similarity matrix sums to 1. Then the cross-entropy between the two normalized graphs are minimized. Hence, the contrastive loss is defined as:

$$\mathcal{L}_u^{ctr} = \frac{1}{\mu B}\sum_{b=1}^{\mu B} H(\hat{W}_b^q, \hat{W}_b^z)$$

where $H(\hat{W}_b^g, \hat{W}_b z)$ can be decomposed into two terms:

$$-\hat{W}_{bb}^q \log\left(\frac{\exp(z_b \cdot z_j/t)}{\sum_{j=1}^{\mu B} \hat{W}_{bj}^z}\right) - \sum_{j=1, j\neq b}^{\mu B} \hat{W}_{bj}^q \log\left(\frac{\exp(z_b \cdot z_j/t)}{\sum_{j=1}^{\mu B} \hat{W}_{bj}^z}\right)$$

where the first term is a self-supervised contrastive loss that comes from the self-loops in the pseudo-label graph. The self-supervised contrastive loss encourages the model to produce similar embeddings for different augmentations of the same image, which is a form of consistency regularization. The second term encourages samples with similar pseudo-labels to have similar embed-dings. It gathers samples from the same class into clusters, which achieves entropy minimization.

During training, the model may start with producing low-confidence pseudo-labels, which leads to a sparse pseudo-label graph at 306. As training progresses, samples are gradually clustered, which in turns leads to more confident pseudo-labels and more connections in the pseudo-label graph 306. In addition, when the unlabeled data 202 contains out-of-distribution (OOD) samples, due to the smoothness constraint, OOD samples may lead to low-confidence pseudo-labels. Therefore, the OOD samples are less connected in the pseudo-label graph compared to in-distribution samples and will be pushed further away from in-distribution samples by the proposed contrastive loss.

Figure 4:
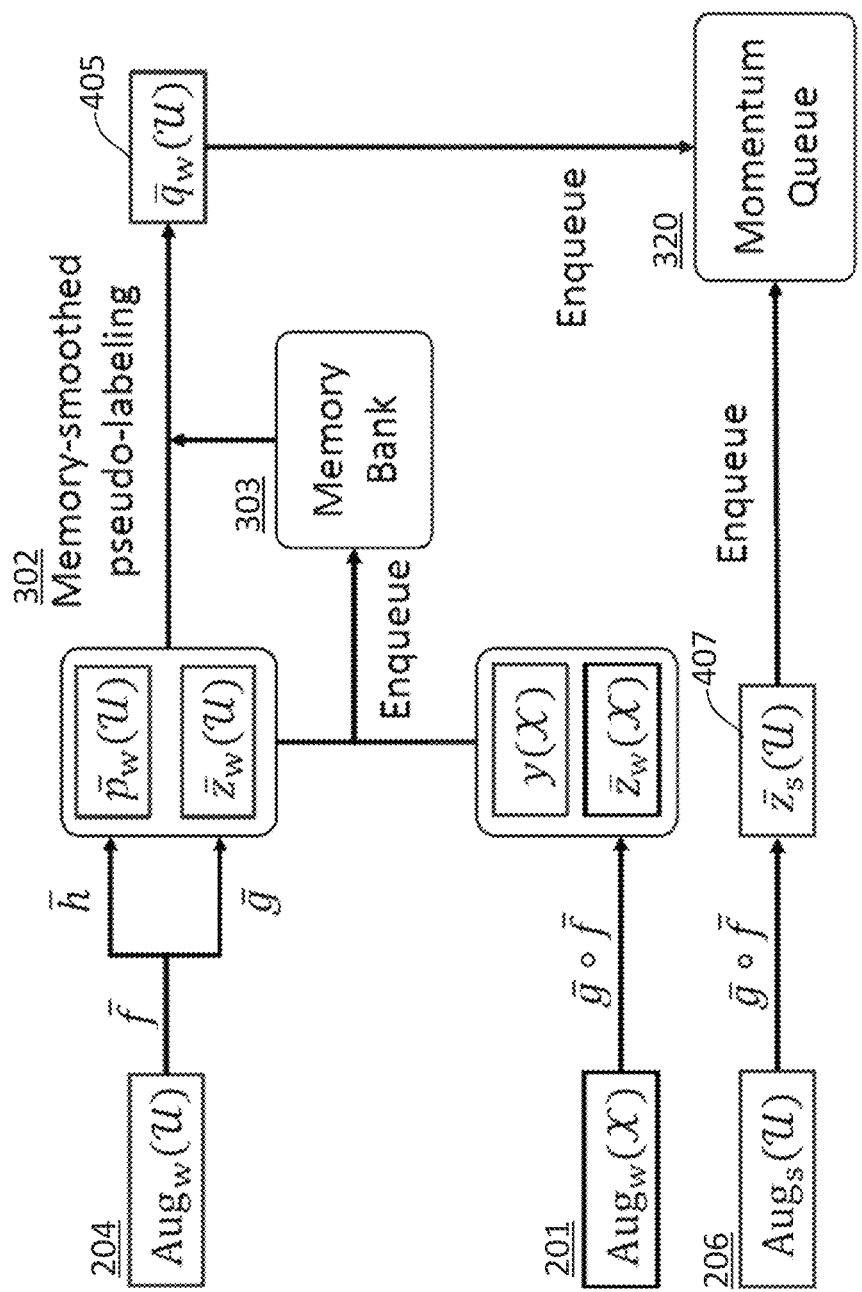
FIG. 4 illustrates an example framework for employing an exponential moving average (EMA) model for constructing the memory bank and a momentum queue, according to embodiments described herein.

FIG. 4 illustrates an example framework for employing an exponential moving average (EMA) model for constructing the memory bank 303 and a momentum queue, according to embodiments described herein. In order to build a meaningful pseudo-label graph 306, the unlabeled batch of data 202 should contain a sufficient number of samples from each class. While this requirement can be easily satisfied for datasets with a small number of classes (e.g. the dataset of CIFAR-10), it becomes difficult for large datasets with more classes (e.g. the dataset of ImageNet), because a large unlabeled batch may exceed the memory capacity of 8 commodity GPUs (e.g. NVIDIA V100).

In view of the capacity limit of the hardware resources, an EMA model $\{\bar{f}, \bar{g}, \bar{h}\}$ can be applied, whose parameters $\bar{\theta}$ are the moving-average of the original model's parameters $\theta$:

$$\bar{\theta} \leftarrow m\bar{\theta} + (1-m)\theta$$

Thus, the EMA model can evolve smoothly as controlled by the momentum parameter m.

Specifically, for the weakly augmented unlabeled sample 204, weakly-augmented labeled sample 201, and strongly-augmented unlabeled samples 206, the EMA models are applied in a similar way as described in relation to FIGS. 2-3, replacing the original encoder f, classification head h, and the projection head g. The pseudo-labels 405 may be generated in a similar way as the memory-smoothed pseudo-labeling process 302 described in FIG. 3. Thus, the memory bank 303 contains the class probability and the low-dimensional embeddings for both weakly-augmented labeled samples and weakly-augmented unlabeled samples.

A momentum queue 320 is used to store the pseudo-labels 405 and the strongly-augmented embeddings 407 for the past K unlabeled samples: $MQ=\{(\bar{q}_k, \bar{z}_k=\bar{g} \circ \bar{f}(Aug'_s(u_k))\}_{k=1}^{K}$, where $\bar{q}_k$ and $\bar{z}_k$ are produced using the EMA model. Different from the memory bank 303, the momentum queue 320 contains the pseudo-labels 405 for the unlabeled samples 202 and their strongly-augmented embeddings 206.

The pseudo-label graph $W^q$ may in turn be revised to have a size of $\mu B \times K$, which defines the similarity between each sample in the current batch and each sample in the momentum queue 320 (which also contains the current batch). Thus, the similarity matrix $W^q$ may be calculated as $\bar{q}_b \cdot \bar{q}_j$, where $b=\{1, \ldots, \mu B\}$ and $j=\{1, \ldots K\}$.

The embedding graph $W^z$ may also be modified to have a size of $\mu B \times K$, where the similarity is calculated using the model's output embedding $z_b$ and the momentum embedding $\bar{z}_j$: $W_{bj}^z = \exp(z_b \cdot \bar{z}_j/t)$. Since gradient only flows back through $z_b$, a large K can be used without much increase in GPU memory usage.

In addition to the contrastive loss, the EMA model may also be applied for memory-smoothed pseudo-labeling, by forwarding the weakly-augmented samples through the EMA model instead of the original model.

Figure 5:
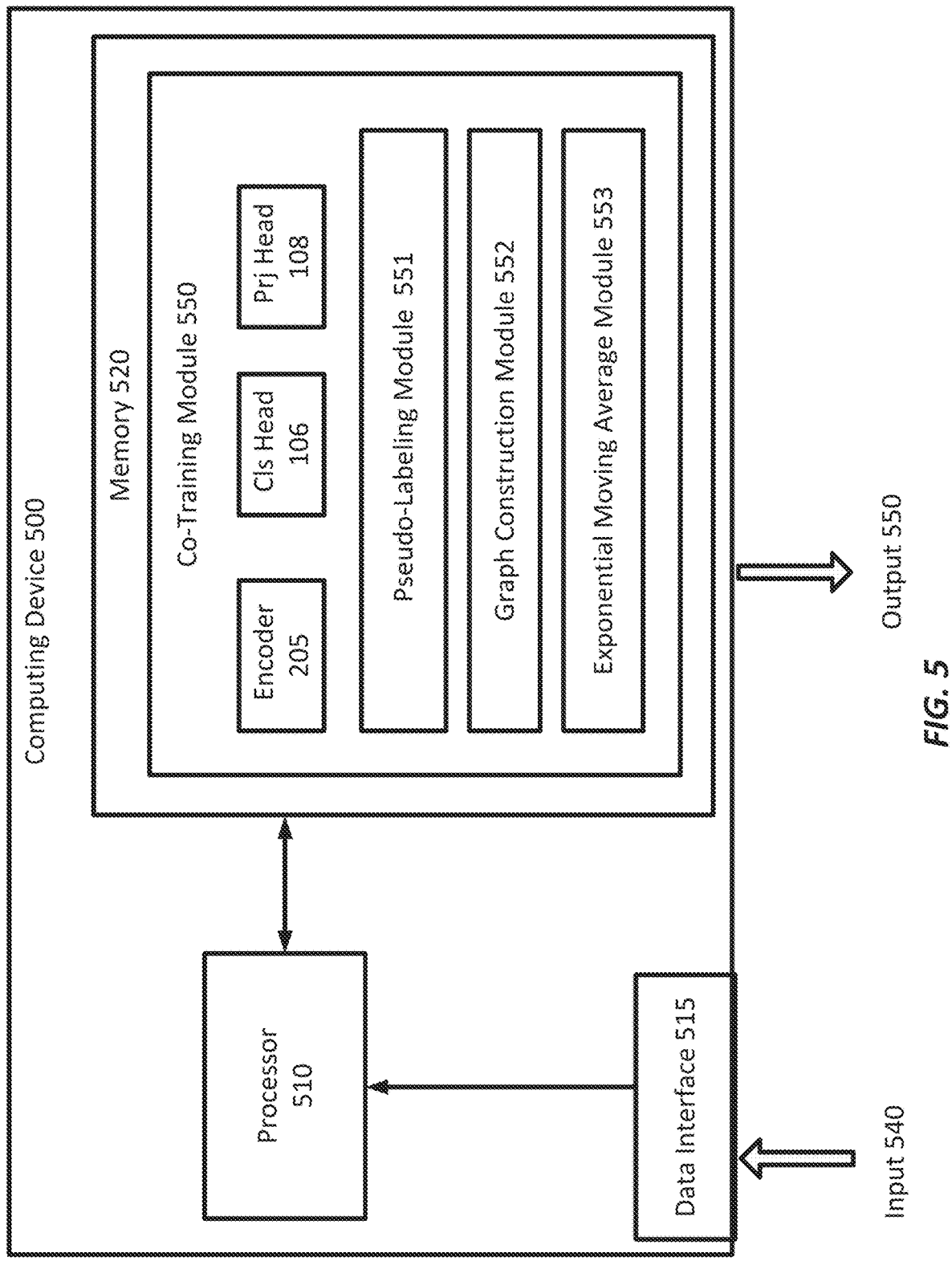
FIG. 5 is a simplified diagram of a computing device for implementing co-training, according to some embodiments.

FIG. 5 is a simplified diagram of a computing device for implementing co-training, according to some embodiments. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for a co-training module 550 that may be used to implement and/or emulate the systems and models, and/or to implement any of the methods described further herein. In some examples, the co-training module 550, may receive an input 540, e.g., such as unlabeled image samples, via a data interface 515. The data interface 515 may be any of a user interface that receives a user uploaded image sample, or a communication interface that may receive or retrieve a previously stored image sample from the database. The co-training module 550 may generate an output 550 such as classification result of the input 540.

In some embodiments, the co-training module 550 may further includes encoder 205, classification head 106, projection head 108, pseudo-labeling module 551, a graph construction module 552 and an EMA module 553. In some examples, the co-training module 550 and the sub-modules 205, 106, 108 and 551-553 may be implemented using hardware, software, and/or a combination of hardware and software. For instance, the encoder 205 may be implemented by a CNN 105 as shown in FIG. 1. The pseudo-labeling module 551 may include any hardware or software that is implemented to generate the pseudo-labels 305 or 405. The graph construction module 552 may include any hardware or software that is implemented to generate a graph from a vector space, such as the pseudo-label graph 306, or the embedding graph 308. The EMA module 553 may generate exponential moving average parameters for submodules 205, 106 and 108, as described in relation to FIG. 4.

Work Flow

Figure 6:
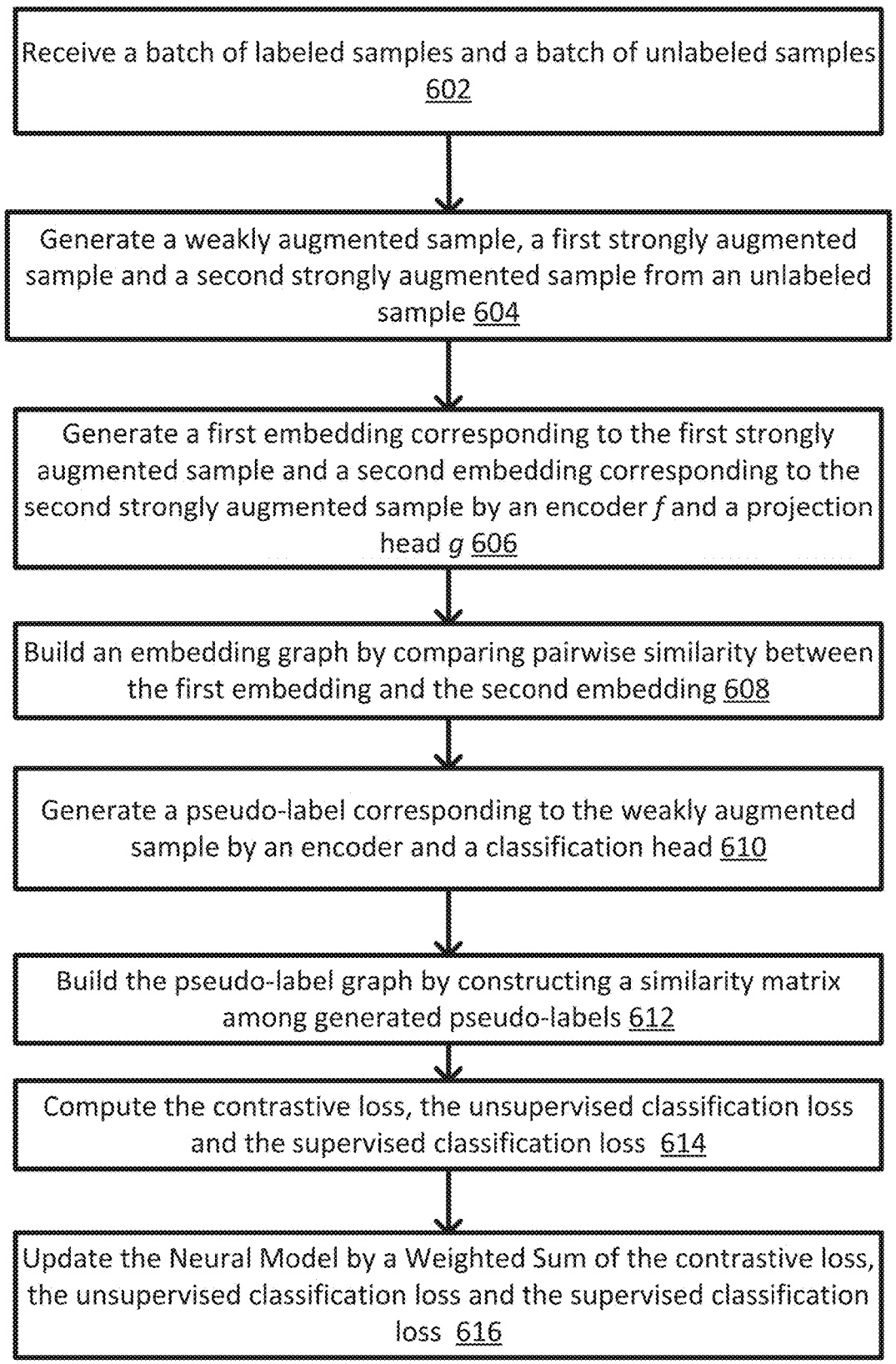
FIG. 6 provides an example logic flow diagram illustrating a method of semi-supervised learning with contrastive graph regularization, and FIG. 7 provides an example pseudo-code segment illustrating the algorithmic details of the work flow in FIG. 6, according to embodiments described herein.

FIG. 6 provides an example logic flow diagram illustrating a method of semi-supervised learning with contrastive graph regularization, and FIG. 7 provides an example pseudo-code segment illustrating the algorithmic details of the work flow in FIG. 6, according to embodiments described herein. One or more of the processes 602-616 of method 600 may be implemented, at least in part, in the form of executable code stored on non-transitory, tangible, machine-readable media that when run by one or more processors may cause the one or more processors to perform one or more of the processes 602-616. In some embodiments, method 600 may correspond to the method used by the module 550.

At step 602, a batch of labeled samples (e.g., labeled data X 210) and a batch of unlabeled samples (e.g., unlabeled data U 202) are received, e.g., via data interface 515 in FIG. 5. In one implementation, the batch of labeled samples are associated with ground-truth labels.

At step 604, a weakly augmented sample (e.g., 204), a first strongly augmented sample (e.g., 206a) and a second strongly augmented sample (e.g., 206b) are generated from an unlabeled sample. In one implementation, a weakly augmented sample is also generated from a labeled sample.

At step 606, a first embedding (e.g., z in FIG. 3) corresponding to the first strongly augmented sample and a second embedding (e.g., z' in FIG. 3) corresponding to the second strongly augmented sample, are generated by an encoder f and a projection head g. For example, details of step 606 may include steps 10-11 in Alg. 1 of FIG. 7.

At step 608, an embedding graph (e.g., 308) may be built by comparing pairwise similarity between the first embedding and the second embedding. For example, details of step 608 may include steps 16 and 19 in Alg. 1 of FIG. 7

At step 610, a pseudo-label (e.g., 305) corresponding to the weakly augmented sample is generated, by an encoder and a classification of the neural model. For example, details of step 610 may include steps 3-9 in Alg. 1 of FIG. 7.

At step 612, the pseudo-label graph (e.g., 306) is built by constructing a similarity matrix among generated pseudo-labels corresponding to the batch of unlabeled samples. For example, details of step 612 may include steps 15 and 18 in Alg. 1 of FIG. 7.

At step 614, a contrastive loss (e.g., 230) is computed based on a cross-entropy between the embedding graph and the pseudo-label graph; an unsupervised classification loss (e.g., 220) is computed based on a cross-entropy between the pseudo label and the classification probability for the weakly augmented sample; and a supervised classification loss (e.g., 210) is computed based on a ground-truth label corresponding to the labeled sample and classification prediction in response to the labeled sample. For example, details of step 614 may include steps 21-23 in Alg. 1 of FIG. 7.

At step 616, a weighted sum of the contrastive loss, the unsupervised classification loss and the supervised classification loss is computed, and the neural model {f, g, h} is jointly updated by the weighted sum via backpropagation. For example, details of step 616 may include steps 24-25 in Alg. 1 of FIG. 7.

Example Performance

The co-training network is evaluated on several datasets including CIFAR-10, STL-10 and ImageNet. Experiments on CIFAR-10 and STL-10 datasets are conducted. CIFAR-10 contains 50,000 images of size 32×32 from 10 classes. The amount of labeled data are varied and experimented with fewer labels than previously considered. 5 runs with different random seeds are evaluated. STL-10 contains 5,000 labeled images of size 96×96 from 10 classes and 100,000 unlabeled images including OOD samples.

Existing method FixMatch with distribution alignment is used to build a stronger baseline. CoMatch is also compared with the original FixMatch and MixMatch. The baselines are reimplemented and performed all experiments using the same model architecture, the same codebase, and the same random seeds.

Self-supervised pre-training can provide a good model initialization for semi-supervised learning. Therefore, models pre-trained using SimCLR for 100 epochs are experimented with.

A Wide ResNet-28-2 with 1.5M parameters for CIFAR-10, and a ResNet-18 with 11.5M parameters for STL-10. The projection head is a 2-layer MLP which outputs 64-dimensional embeddings. The models are trained using SGD with a momentum of 0.9 and a weight decay of 0.0005. The training lasts for 200 epochs, using a learning rate of 0.03 with a cosine decay schedule. All baselines follow the same training protocol, except for MixMatch which is trained for 1024 epochs. For the hyperparameters in CoMatch: $\lambda_{cls}=1$, $\tau=0.95$, $\mu=7$, B=64. For the additional hyperparameters, $\alpha=0.9$, K=2560, t=0.2, and $\lambda_{ctr} \in \{1, 5\}$, T$\in\{0.7, 0.8\}$.

CoMatch uses "weak" and "strong" augmentations. The weak augmentation for all experiments is the standard crop-and-flip strategy. For strong augmentations, CIFAR-10 uses RandAugment which randomly selects from a set of transformations (e.g., color inversion, translation, contrast adjustment) for each sample. STL-10 uses the augmentation strategy in SimCLR which applies random color jittering and grayscale conversion.

Table 1 in FIG. 8 shows that CoMatch substantially outperforms the best baseline (FixMatch w. DA) across all settings. For example, CoMatch achieves an average accuracy of 81.19% on CIFAR-10 with only 2 labels per class, whereas FixMatch (w. DA) has a lower accuracy of 59.42% and a larger variance. On STL-10, CoMatch also improves FixMatch (w. DA) by 19.26%. Self-supervised pre-training with SimCLR leads to improved performance for both Co-Match and FixMatch. However, CoMatch without SimCLR still outperforms FixMatch (w. DA) with SimCLR.

CoMatch is also evaluated on ImageNet ILSVRC-2012 to verify its efficacy on large-scale datasets. 1% or 10% of images are sampled with labels in a class-balanced way (13 or 128 samples per-class, respectively), while the rest of images are unlabeled.

The baselines include (1) semi-supervised learning methods and (2) self-supervised pre-training followed by fine-tuning. Furthermore, a state-of-the-art baseline combines FixMatch (w. DA) with self-supervised pre-training using MoCov2 (pre-trained for 800 epochs). Self-supervised methods re-quire additional model parameters during training due to the projection network. The number of training parameters is counted as those that require gradient update.

A ResNet-50 model is used as the encoder. The projection head is a 2-layer MLP which outputs 128-dimensional embeddings. The model is trained using SGD with a momentum of 0.9 and a weight decay of 0.0001. The learning rate is 0.1, which follows a cosine decay schedule for 400 epochs. For models that are initialized with MoCov2, a smaller learning rate of 0.03 is used. The momentum parameter is set as m=0.996.

Table 2 in FIG. 9 shows that CoMatch achieves superior performance. CoMatch obtains a top-1 accuracy of 66.0% on 1% of labels. Compared to the best baseline (MoCov2 followed by FixMatch w. DA), Co-Match achieves 6.1% improvement with 3× less training time. With the help of MoCov2 pre-training, the performance of CoMatch can further improve to 67.1% on 1% of labels, and 73.7% on 10% of labels.

Figure 10:
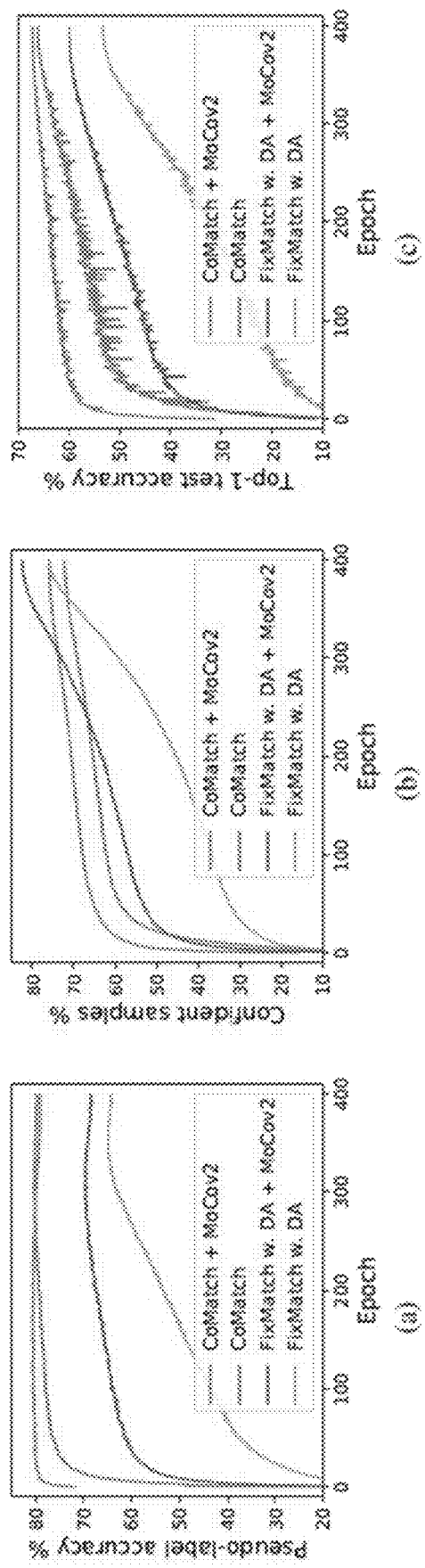

FIG. 10 plots of different methods as training progresses on ImageNet with 1% labels. (a) accuracy of the confident pseudo-labels w.r.t to the ground-truth labels of the unlabeled samples. (b) ratio of the unlabeled samples with confident pseudo-labels that are included in the unsupervised classification loss. (3) top-1 accuracy on the test data. In FIG. 3, CoMatch produces pseudo-labels that are more confident and accurate. Pre-training with MoCov2 helps speed up the convergence rate.

Ablation study is performed to examine the effect of different components in CoMatch. ImageNet with 1% labels is used as the main experiment. Due to the number of experiments in the ablation study, the top-1 accuracy is reported after training for 100 epochs, where the default setting of CoMatch achieves 57.1%.

Figure 11:
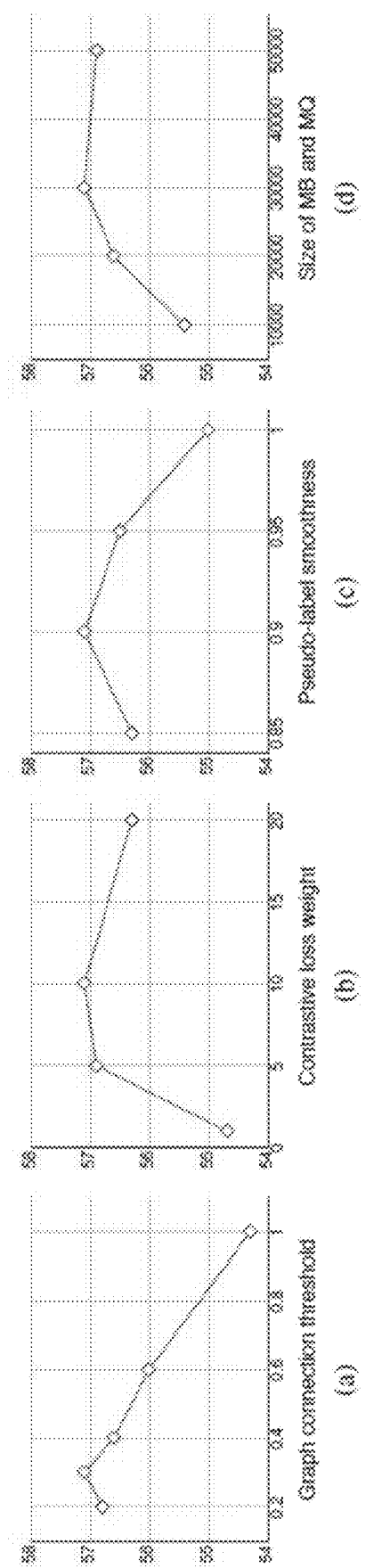

The threshold T for graph connection controls the sparsity of edges in the pseudo-label graph. FIG. 11(a) presents the effect of T. As T increases, samples whose pseudo-labels have lower similarity are disconnected. Hence their embeddings are pushed apart by the contrastive loss. When T=1, the proposed graph-based contrastive loss downgrades to the self-supervised loss where the only connections are the self-loops.

The contrastive loss weight $\lambda_{ctr}$ is varied for the contrastive loss as shown in FIG. 11(b), where $\lambda_{ctr}$=10 gives the best performance. With 10% of ImageNet labels, $\lambda_{ctr}$=2 yields better performance. Fewer labeled samples may require a larger $\lambda_{ctr}$ to strengthen the graph regularization.

The memory-smoothed pseudo-labeling uses α to control the balance between the model's prediction and smoothness constraint. FIG. 11(c) shows its effect, where α=0.9 results in the best performance. When α=1, the pseudo-labels completely rely on the model's prediction, which decreases the accuracy by 2.1% due to confirmation bias. When α<0.9, the pseudo-labels are over-smoothed. A potential improvement is to apply sharpening [3] to pseudo-labels with smaller α, but is not studied here due to the need for an extra sharpening hyperparameter.

The size of memory bank and momentum queue K controls both the size of the memory bank for pseudo-labeling and the size of the momentum queue for contrastive learning. A larger K considers more samples to enforce a structural constraint on the label space and the embedding space. As shown in FIG. 11(d), the performance increases as K in-creases from 10k to 30k, but plateaus afterwards.

The quality of the representations learned by CoMatch is further evaluated by transferring it to other tasks. Linear classification is performed on two datasets: PASCAL VOC2007 for object classification and Places205 for scene recognition. Linear SVMs are trained using fixed representations from ImageNet pre-trained models. All images are preprocessed by resizing them to 256 pixels along the shorter side and taking a 224×224 center crop. The SVMs are trained on the global average pooling features of ResNet-50. To study the transferability of the representations in few-shot scenarios, the number of samples is varied per-class (k) in the downstream datasets.

Figures 12, 13:
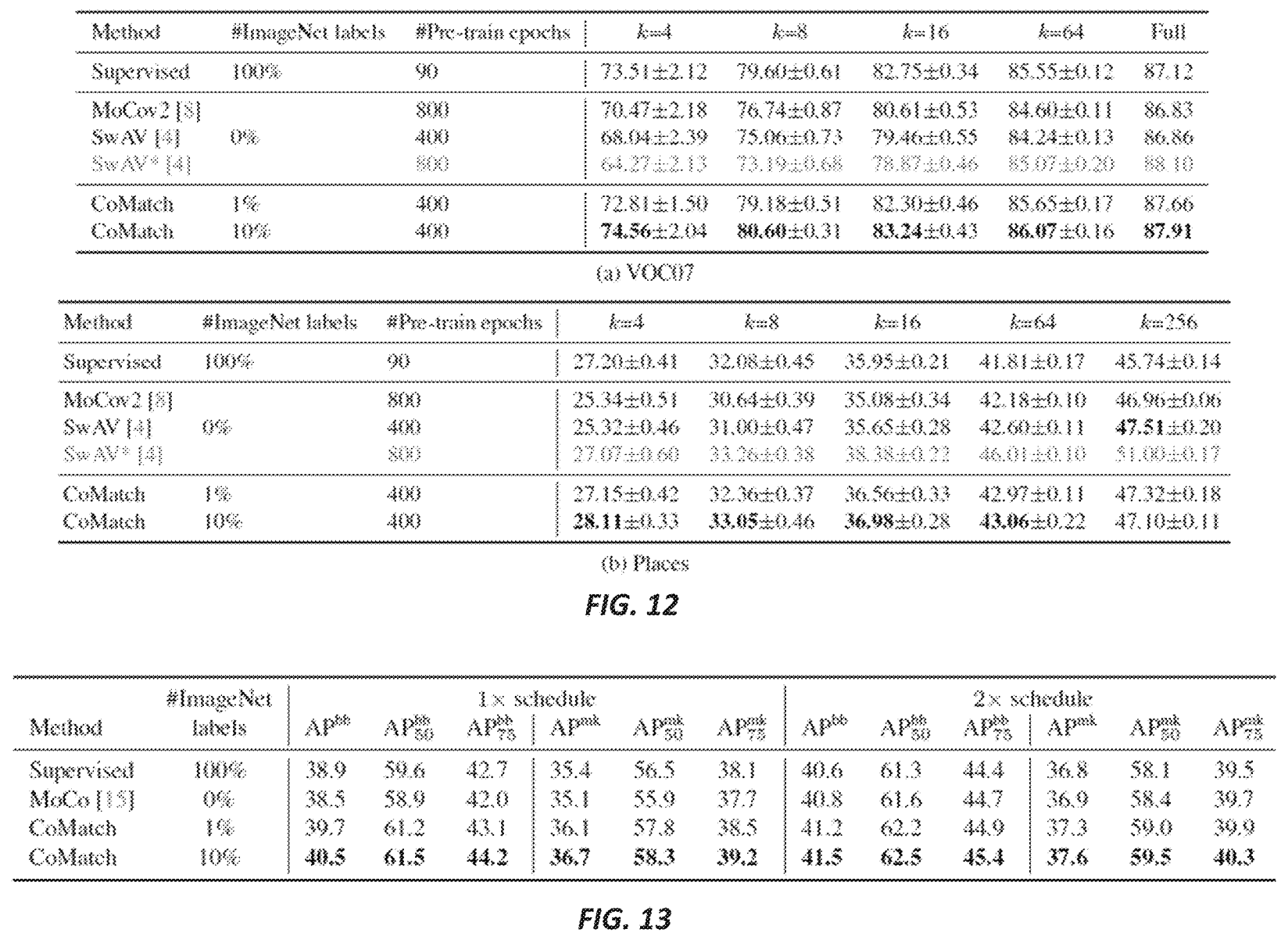

FIG. 12 compares CoMatch with standard supervised learning on labeled ImageNet and self-supervised learning (MoCov2 and SwAV on unlabeled ImageNet). CoMatch with 10% labels achieves superior performance on both datasets, except for Places with k=256. It is interesting to observe that self-supervised learning methods do not perform well in few-shot transfer, and only catch up with supervised learning when k increases.

FIG. 13 shows transferring the pre-trained models to object detection and instance segmentation on COCO, by fine-tuning Mask-RCNN with R50-FPN. Compared to supervised learning, CoMatch provides a better backbone for object detection and instance segmentation on COCO.

Some examples of computing devices, such as computing device 100 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

This application is further described with respect to the attached document in Appendix I., entitled "Co-training: Semi-Supervised Learning with Contrastive Graph Regularization," 11 pages, which is considered part of this disclosure and the entirety of which is incorporated by reference.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for semi-supervised learning with contrastive graph regularization, the method comprising:
   receiving a batch of unlabeled image samples;
   generating, from an unlabeled image sample, a weakly augmented image sample, a first strongly augmented image sample, and a second strongly augmented image sample;
   generating, by an encoder and a classification of a neural model, a pseudo-label corresponding to the weakly augmented image sample, wherein the pseudo-label is generated by:
      generating, by the encoder and the classification of the neural model, a classification probability for the weakly augmented image sample,
      generating, by the encoder and a projection head of the neural model, an embedding for the weakly augmented image sample,
      storing, at a memory bank, the generated classification probability and the generated embedding, and
      aggregating class probabilities from neighboring samples in the memory bank to compute the pseudo-label;
   generating, by the neural model, a first embedding corresponding to the first strongly augmented image sample and a second embedding corresponding to the second strongly augmented image sample;
   building an embedding graph by comparing pairwise similarity between the first embedding and the second embedding;
   generating a pseudo-label graph, comprising: constructing a similarity matrix among generated pseudo-labels corresponding to the batch of unlabeled image samples, wherein the similarity matrix contains a first similarity comparing each generated pseudo-label to itself, and a second similarity comparing each generated pseudo-label to another pseudo-label;
   computing a contrastive loss based on a cross-entropy between the embedding graph and the pseudo-label graph;
   computing an unsupervised classification loss based on a cross-entropy between the pseudo label and the classification probability for the weakly augmented image sample;
   updating the neural model based at least in part on the contrastive loss and the unsupervised classification loss via backpropagation;
   receiving, via a user data interface, an input image for classification; and
   generating, via the neural model, an output classification for the input image.

2. The method of claim 1, wherein the first embedding and the second embedding are generated by an encoder and a projection head of the neural model.

3. The method of claim 1, further comprising:
   storing class probabilities or embeddings generated from unlabeled image samples and labelled image samples at the memory bank according to a first-in-first-out strategy.

4. The method of claim 1, wherein the generated classification probability is smoothed by a moving-average over a plurality of generated classification probabilities during training.

5. The method of claim 1, further comprising: unsupervised classification loss receiving a batch of labeled image samples with ground-truth labels;
   generating, by an encoder and a classification head of the neural model, a third classification prediction of a labeled image sample; and
   computing a supervised classification loss between a ground-truth label corresponding to the labeled image sample and the third classification prediction.

6. The method of claim 5, further comprising:
   computing a weighted sum of the supervised classification loss, the unsupervised classification loss and the contrastive loss; and
   jointly training the encoder, the classification head, and the projection head of the neural model based on the weighted sum.

7. The method of claim 1, further comprising:
   updating parameters of an encoder, classification head and a projection head of the neural model with a moving average of the parameters.

8. A system for semi-supervised learning with contrastive graph regularization, the system comprising:
   a data interface that receives a batch of unlabeled image samples;
   a memory that stores a neural model;
   a processor that reads instructions from the memory to perform:
      generating, from an unlabeled image sample, a weakly augmented image sample, a first strongly augmented image sample, and a second strongly augmented image sample;
      generating, by an encoder and a classification of the neural model, a pseudo-label corresponding to the weakly augmented image sample, wherein the pseudo-label is generated by:
         generating, by the encoder and the classification of the neural model, a classification probability for the weakly augmented image sample,
         generating, by the encoder and a projection head of the neural model, an embedding for the weakly augmented image sample,
         storing, at a memory bank, the generated classification probability and the generated embedding, and
         aggregating class probabilities from neighboring samples in the memory bank to compute the pseudo-label;
      generating, by the neural model, a first embedding corresponding to the first strongly augmented image sample and a second embedding corresponding to the second strongly augmented image sample;
      building an embedding graph by comparing pairwise similarity between the first embedding and the second embedding;
      generating a pseudo-label graph, comprising: constructing a similarity matrix among generated pseudo-labels corresponding to the batch of unlabeled image samples, wherein the similarity matrix contains a first similarity comparing each generated pseudo-label to itself, and a second similarity comparing each generated pseudo-label to another pseudo-label;
      computing a contrastive loss based on a cross-entropy between the embedding graph and the pseudo-label graph;
      computing an unsupervised classification loss based on a cross-entropy between the pseudo label and the classification probability for the weakly augmented image sample;

updating the neural model based at least in part on the contrastive loss and the unsupervised classification loss via backpropagation;

receiving, via a user data interface, an input image for classification; and generating, via the neural model, an output classification for the input image.

9. The system of claim 8, wherein the first embedding and the second embedding are generated by an encoder and a projection head of the neural model.

10. The system of claim 8, wherein the processor further reads instructions from the memory to perform:

storing class probabilities or embeddings generated from unlabeled image samples and labeled image samples at the memory bank according to a first-in-first-out strategy.

11. The system of claim 8, wherein the generated classification probability is smoothed by a moving-average over a plurality of generated classification probabilities during training.

12. The system of claim 8, wherein the processor further reads instructions from the memory to perform:

receiving a batch of labeled image samples with ground-truth labels;

generating, by an encoder and a classification head of the neural model, a third classification prediction of a labeled image sample; and computing a supervised classification loss between a ground-truth label corresponding to the labeled image sample and the third classification prediction.

13. The system of claim 12, wherein the processor further reads instructions from the memory to perform:

computing a weighted sum of the supervised classification loss, the unsupervised classification loss and the contrastive loss; and jointly training the encoder, the classification head, and the projection head of the neural model based on the weighted sum.

14. A non-transitory processor-readable medium storing processor-executable instructions for semi-supervised learning with contrastive graph regularization, the instructions being executed by a processor to perform:

receiving a batch of unlabeled image samples;

generating, from an unlabeled image sample, a weakly augmented image sample, a first strongly augmented image sample, and a second strongly augmented image sample;

generating, by an encoder and a classification of a neural model, a pseudo-label corresponding to the weakly augmented image sample, wherein the pseudo-label is generated by:

generating, by the encoder and the classification of the neural model, a classification probability for the weakly augmented image sample, generating, by the encoder and a projection head of the neural model, an embedding for the weakly augmented image sample, storing, at a memory bank, the generated classification probability and the generated embedding, and aggregating class probabilities from neighboring samples in the memory bank to compute the pseudo-label;

generating, by the neural model, a first embedding corresponding to the first strongly augmented image sample and a second embedding corresponding to the second strongly augmented image sample;

building an embedding graph by comparing pairwise similarity between the first embedding and the second embedding;

generating a pseudo-label graph, comprising: constructing a similarity matrix among generated pseudo-labels corresponding to the batch of unlabeled image samples, wherein the similarity matrix contains a first similarity comparing each generated pseudo-label to itself, and a second similarity comparing each generated pseudo-label to another pseudo-label;

computing a contrastive loss based on a cross-entropy between the embedding graph and the pseudo-label graph;

computing an unsupervised classification loss based on a cross-entropy between the pseudo label and the classification probability for the weakly augmented image sample;

updating the neural model based at least in part on the contrastive loss and the unsupervised classification loss via backpropagation;

receiving, via a user data interface, an input image for classification; and generating, via the neural model, an output classification for the input image.

* * * * *